March 31, 1964 F. V. SWANSON ETAL 3,126,927
TREE CUTTING DEVICE
Filed Jan. 9, 1962 2 Sheets-Sheet 1
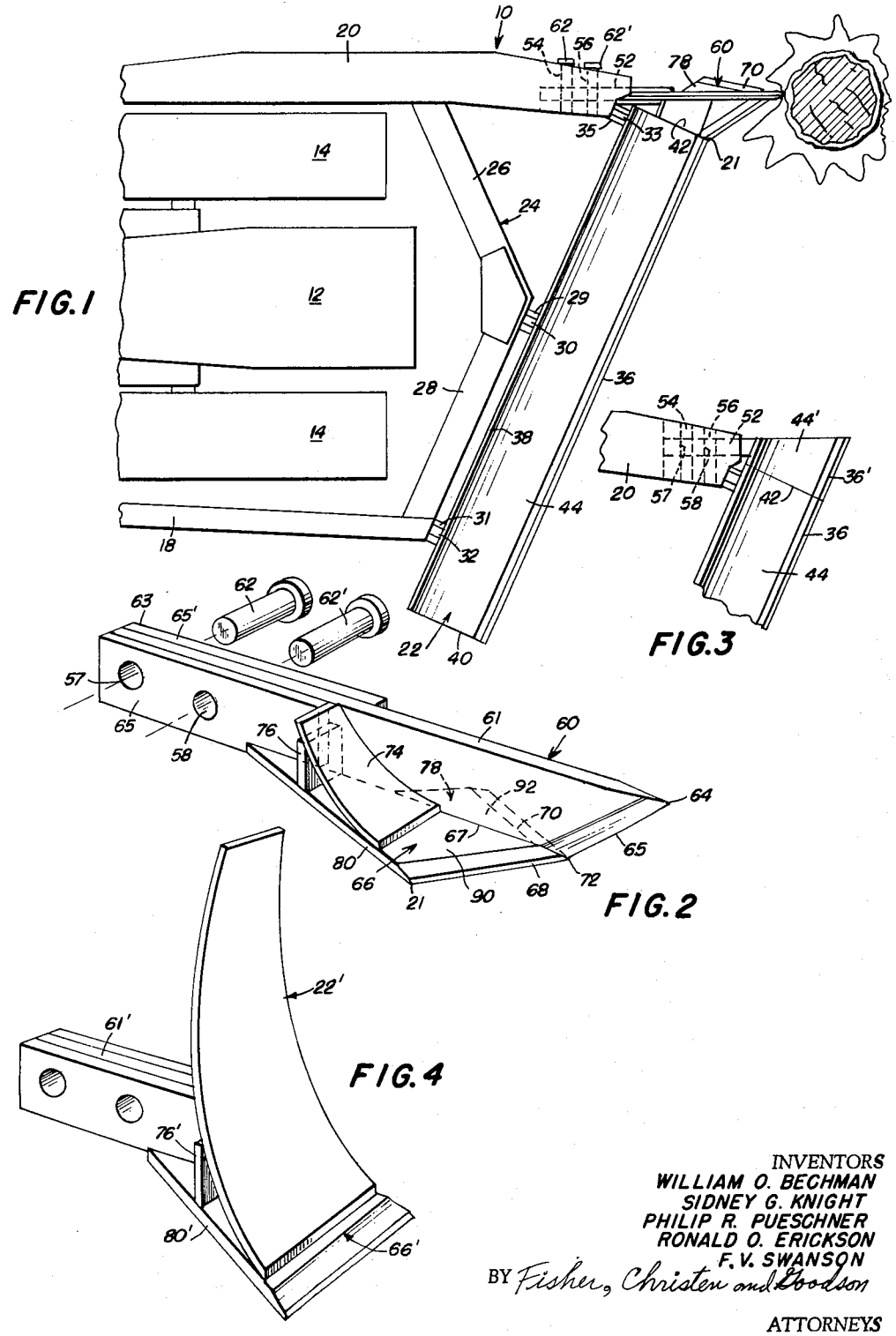
INVENTORS
WILLIAM O. BECHMAN
SIDNEY G. KNIGHT
PHILIP R. PUESCHNER
RONALD O. ERICKSON
F. V. SWANSON
BY Fisher, Christen and Woodson
ATTORNEYS March 31, 1964   F. V. SWANSON ETAL   3,126,927
TREE CUTTING DEVICE Filed Jan. 9, 1962   2 Sheets-Sheet 2

INVENTORS
WILLIAM O. BECHMAN
SIDNEY G. KNIGHT
PHILIP R. PUESCHNER
RONALD O. ERICKSON
F. V. SWANSON
BY Fisher, Christen and Goodson
ATTORNEYS

United States Patent Office 3,126,927
Patented Mar. 31, 1964

3,126,927
TREE CUTTING DEVICE
F. V. Swanson, Wauconda, Ill., Sidney G. Knight, Schofield, and Philip R. Pueschner and Ronald O. Erickson, Wausau, Wis., and William O. Bechman, Arlington Heights, Ill., assignors to Drott Manufacturing Corporation, Milwaukee, Wis., a corporation of Wisconsin
Filed Jan. 9, 1962, Ser. No. 165,115
4 Claims. (Cl. 144—34)

This invention relates to an attachment for use with a bulldozer blade of a type used in ground clearing and tree removal operations, and particularly relates to an attachment for enabling the blade to split and shear trees having diameters greater than those which could be sheared by the bulldozer blade itself.

An important objective of this invention is to provide a shearing attachment, including a pointed stinger arm and a wedge-shaped cutting blade, detachably mounted to the end of a thrust or push beam.

A further objective of the invention is to provide such an attachment with a penetrating stinger arm and a scoring blade having cutting edges in the same plane as the cutting edge of the bulldozer blade and extending to both sides of the arm. The scoring blade, on the outboard side of the arm, scores the initial cut on the opposite side of the arm from the bulldozer blade and greatly improves the splitting characteristics of the attachment during a second pass through large trees.

A further objective of this invention is to provide a tree penetrating and splitting attachment which reduces the difficulty which sometimes occurs in removing such attachments after they have penetrated a tree.

A further objective of this invention is to provide a detachable splitting assembly which is supported directly to a push beam in a manner providing a maximum transmission of force from the tractor to the splitting assembly, while further providing structure which transmits a portion of the back-force exerted by the tree being split to the bulldozer blade assembly.

Another important objective of this invention is to increase the flexibility of such a splitting attachment by providing means by which the cutting attachment can be readily removed and replaced with an extension, which follows the contours of the original blade, and is more adaptable for use in clearing brush or small undergrowth.

Another objective of the invention is to provide a tree splitting attachment having means causing a first vertical initial split, followed by a gradual horizontal scoring on both sides of the split, and one of the scored sides followed by a further cutting by the bulldozer blade.

Further objectives and advantages of this invention will be apparent from the drawings, the following description and claims wherein the construction, arrangement, and cooperation of the several parts of the invention are set forth.

In the drawings:

FIGURE 1 is a plan view with portions broken away, showing the position of the attachment just prior to its insertion into the tree;

FIGURE 2 is an exploded perspective view of the splitting assembly showing the retaining pins;

FIGURE 3 is a plan view showing the bulldozer blade extension substituted for the splitting assembly;

FIGURE 4 is a perspective view of the blade extension;

Figure 5:
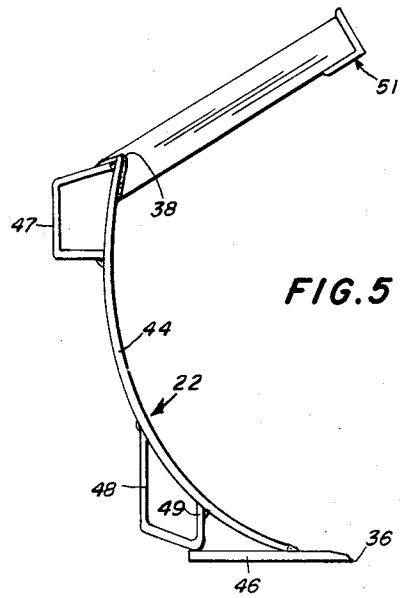
FIGURE 5 is an end view of the bulldozer blade.
Figure 6:
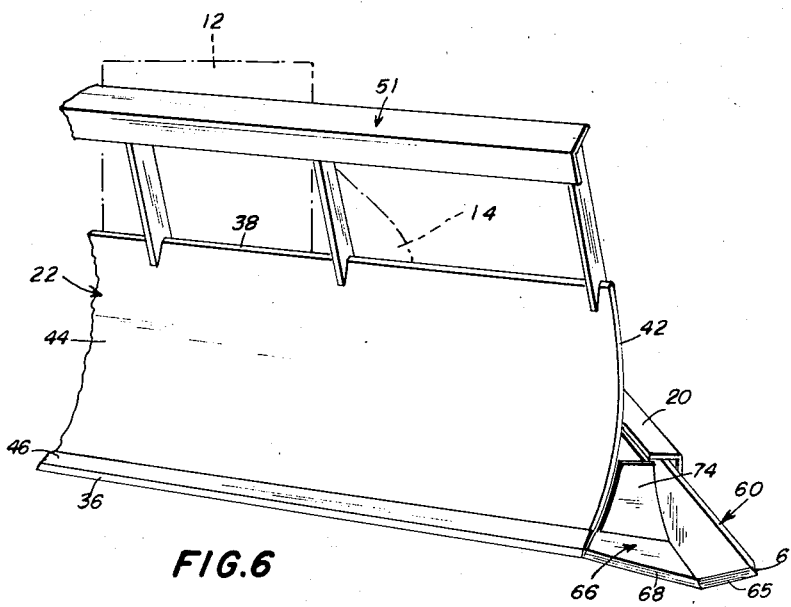
FIGURE 6 is a partial front perspective of the splitting assembly attached to the blade.

Referring now to the drawings wherein like numerals indicate like elements, the numeral 10 is used to generally indicate a tractor and blade assembly of the type for use with this invention. A track-laying vehicle 12 having treads 14 and 16 is equipped with a pair of support members 18 and 20 one on each side thereof. These members are affixed to the tractor for limited vertical pivotal movement and support a brush-clearing bulldozer blade 22 forwardly of the vehicle.

Member 20 is a reinforced thrust or push beam and is of greater length and strength than the member or arm 18. Mounted between the arm 18 and thrust beam 20 is a framing member 24 comprised of angularly disposed legs 26 and 28.

The blade 22 has a plurality of rearwardly extending lugs 30 and 32 received by a like number of yokes 29 and 31 extending forwardly from leg 28. The dozer blade is thereby mounted parallel to the arm 28 and angularly to the direction of travel. Another rearwardly extending lug 33 is received by a yoke 35 extending from the beam 20. This secures the leading most forward portion of the blade to the thrust beam.

For purposes of this invention, the blade can be considered as rectangular in plan view (FIG. 1) and is defined by a bottom cutting edge 36, a top edge 38, and a trailing end 40, and a leading end 42. Blade 22 has a somewhat conventional cross-sectional configuration, as best seen in FIG. 5. The blade is further comprised of a curved moldboard 44, a bottom cutting knife 46, of which edge 36 is a part, and the reinforcing webs 47 and 48. Web 48, it will be noted, has a substantially vertical leg 49 connecting moldboard 44 and knife 46. These members are suitably welded together and form a rigid unitary member of great strength.

The top edge of the blade is equipped with a pusher element 51 having its most forward portion parallel to and slightly forward of the vertical plane of cutting edge 36. For simplicity of explanation, the pusher element is not shown in the plan view of FIG. 1.

The outer end of thrust beam 20 is provided with a recess 52 having a central axis generally along the longitudinal axis of the beam and parallel to the direction of travel of the vehicle. A pair of pin receiving apertures 54 and 56 run laterally through beam 20 in the vicinity of the recess 52, and are in communication therewith.

A stinger assembly 60 (best seen in FIG. 2) is comprised of a knife-like stinger arm 61 having an apertured mounting end 63 receivable in recess 52. When properly inserted in recess 52, apertures 57 and 58 of the arm are aligned with apertures 54 and 56 of the beam such that pins 62 and 62′ may be inserted and thereby securely mounting the stinger assembly to beam 20. Weld plates 65 and 65′ are provided to increase the strength of the pin connection between beam 20 and the arm 61.

The stinger arm 61 is a vertically disposed bar of toughened steel which tapers to a point 64 at its upper forward end. From point 64, its leading edge tapers inwardly and downwardly along a sharpened edge 65 toward a horizontally disposed wedge-shaped scorer 66. The scorer 66 has two sharpened leading edges 68 and 70 which terminate at an apex 72. The apex 72 also terminates the lower end of edge 65.

The scorer 66 may be grooved along its upper surface at 67 to receive the stinger 61 along which groove they are welded. The connection between the stinger arm 61 and the scorer 66 is further reinforced by a bracing web 74 and a weld element 76.

The scorer 66 has its perimeter completed by a pair of trailing edges 78 and 80. The assembly is so dimensioned that when arm 61 is pinned to the thrust beam 20, edge 80 mates with the angularly disposed lateral leading edge of knife 46. Likewise, the inward end of bracing web 74 will mate with the lower portion of leading edge 42 of the moldboard 44 and bracket 76 will mate with the leg 49 of web 48. This angular bearing relationship aids in relieving a portion of the shear stress normally expected on pins 62 and 62' and transmits it to the blade assembly. Along its forward end, the sharpened edge 68 merges with edge 36 of the bulldozer blade at 21 and, in effect, becomes a forwardly directed extension thereof.

Since apex 72 and the bottom of edge 36 merge by way of edge 68, and since arm 61 longitudinally divides the scorer plate 66, there is formed a penetration member having a horizontally disposed inboard cutter 90 and a horizontally disposed outboard cutter 92 on either side of vertical arm 61.

In operation point 64 of the stinger assembly is placed against a tree trunk and a longitudinal thrust is exerted by the vehicle through thrust beam 20 forcing the stinger arm into the tree. The vertical knife edge 65 splits the tree vertically and the cutter blades 90 and 92 score either side of the split as they pass therethrough. As the vehicle forces the point 64 further into the tree, that portion toward the blade will be severed by the leading edge 68. If succeeding passes are required, the score made by cutter 92 during the first pass increases the efficiency of the attachment during succeeding passes. In instances of very large trees, where too great a bite is attempted on an initial pass, the scoring accomplished by cutters 90 and 92 facilitates the removal of the stinger assembly from the tree.

The blade extension 44', to be used in lieu of the stinger attachment 60, is shown in FIGS. 3 and 4. Its normal use is during operations not requiring a splitting operation; such as during the clearance of bushes, small undergrowth, and the like. Its substitution is obvious and numbers similar to corresponding elements of the stinger attachment are given with primes for clarity.

In a general manner, while there has been disclosed in the above description, what is deemed to be the most practical and efficient embodiment of the invention, it should be well understood that the invention is not limited to such an embodiment as there might be changes made in the arrangement, disposition and form of the parts without departing from the principle of the present invention as comprehended within the scope of the accompanying claims.

We claim:

1. A tree splitting and cutting device for attachment to a bulldozer blade mounted forwardly of a vehicle and angularly disposed to the direction of travel of said vehicle, said blade having a sharpened bottom edge and mounted to said vehicle between a first beam attached to the trailing portion of said blade and a thrust beam attached to the leading portion of said blade, that improvement comprising in combination, a stinger arm extending outwardly from said thrust beam to a point beyond said leading portion, a sharpened forward edge of said arm extending from said point downwardly and rearwardly to a second point, a scoring blade attached to said arm comprising a first cutting edge extending angularly rearwardly from said second point, and a second cutting edge angularly disposed to said first cutting edge and extending from said second point to said sharpened bottom edge.

2. A cutting and splitting attachment for use with a vehicle comprising a thrust beam fixed to one side of said vehicle and extending in the direction of travel, a second beam fixed to the other side of said vehicle and extending substantially parallel to said first beam, a bulldozer blade having a cutting edge along its lowermost portion disposed angularly across the front of said vehicle, said thrust beam supporting the forward portion of said blade and said second beam supporting the trailing portion of said blade, a vertical stinger arm extending forwardly from said thrust beam to a point beyond the forward portion of the blade for engaging and penetrating a tree trunk by forward movement of the vehicle, a horizontally disposed wedge-shaped cutter secured below said arm and having cutting portions on either side thereof and the apex of said wedge directly attached to the lower edge of said arm, one of said cutting portions extending to the cutting edge of the blade and a knifelike edge of said arm extending in the vertical plane of the arm between said point and said apex.

3. A tree cutting attachment for use with a tractor mounting a bulldozer blade forwardly of said tractor between a thrust beam and a second beam, each affixed to said tractor, comprising in combination, a stinger arm, means mounting said arm to said thrust beam, said arm extending forwardly of said blade to a point, a substantially horizontal scoring blade attached to the bottom of said stinger arm and having a leading edge forming an extension of the lower portion of said blade, said leading edge extending to a second point, and said stinger arm having a leading sharpened edge extending downwardly and inwardly toward said plate from said first point to said second point.

4. A cutting and splitting assembly mounted at one end of a bull dozer plate comprising a horizontally disposed substantially diamond-shaped plate including a forward apex defined by two sharpened edges and a trailing edge mating with said end, a vertically disposed stinger arm attached to the upper surface of said plate between said sharpened edges and extending through and beyond said apex, said arm terminating in an upper point, a sharpened leading edge extending from said point to said apex and means for mounting said arm at one end of a bulldozer plate projecting forwardly therefrom.

References Cited in the file of this patent
UNITED STATES PATENTS

| | | |
|---|---|---|
| 2,485,407 | Peterson | Oct. 18, 1949 |
| 2,701,591 | Kissner et al. | Feb. 8, 1955 |
| 2,934,109 | Bles | Apr. 26, 1960 |
| 3,004,570 | Clayton et al. | Oct. 17, 1961 |
| 3,033,253 | Purdy | May 8, 1962 |